United States Patent [19]

Lal et al.

[11] 3,991,262

[45] *Nov. 9, 1976

[54] SULFUR VULCANIZABLE INTERPOLYMERS

[75] Inventors: Joginder Lal, Akron; Paul H. Sandstrom, Tallmadge, both of Ohio

[73] Assignee: The Goodyear Tire & Rubber Company, Akron, Ohio

[ * ] Notice: The portion of the term of this patent subsequent to Jan. 20, 1993, has been disclaimed.

[22] Filed: Nov. 7, 1975

[21] Appl. No.: 629,943

Related U.S. Application Data

[63] Continuation-in-part of Ser. No. 530,917, Dec. 9, 1974, Pat. No. 3,933,769.

[52] U.S. Cl. .............................. 526/336; 526/339; 526/350
[51] Int. Cl.² ...................................... C08F 36/20
[58] Field of Search ................. 260/86.78; 526/336, 526/339

[56] References Cited
UNITED STATES PATENTS

| | | | |
|---|---|---|---|
| 3,492,281 | 1/1970 | Smith et al. | 260/94.3 |
| 3,933,769 | 1/1976 | Lal et al. | 260/80.78 |

*Primary Examiner*—William F. Hamrock
*Attorney, Agent, or Firm*—F. W. Brunner; J. Y. Clowney

[57] ABSTRACT

A method of preparing sulfur vulcanizable unsaturated interpolymers of at least one terminally unsaturated monoolefin selected from the group consisting of 1-butene and α-olefins containing from five to 12 carbon atoms with at least one nonconjugated diolefin selected from the group of 4- and 5-methyl-1,4-hexadienes in which 5-methyl-1,4-hexadiene is at least 15 mole percent and in which the terminally unsaturated monoolefin comprises from about 98 to about 50 mole percent of the total.

8 Claims, 2 Drawing Figures

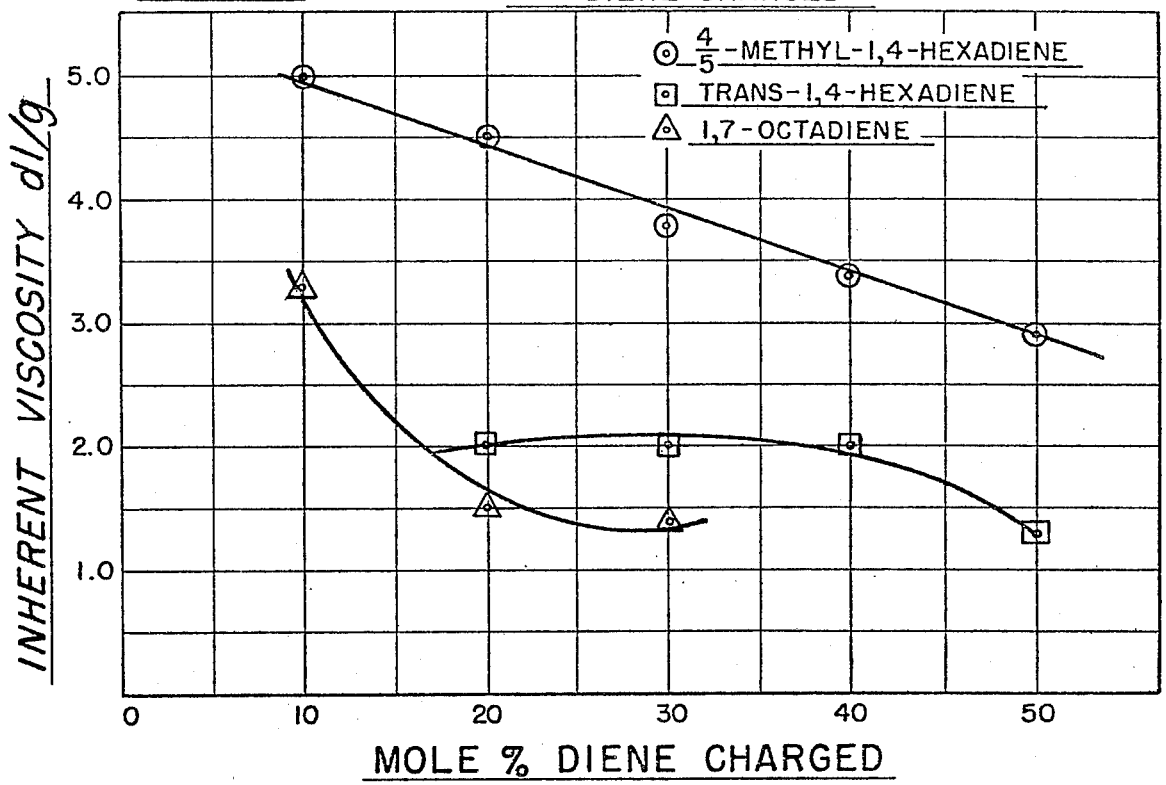
FIG. 1 INHERENT VISCOSITY OF INTERPOLYMERS VS. DIENE CHARGED
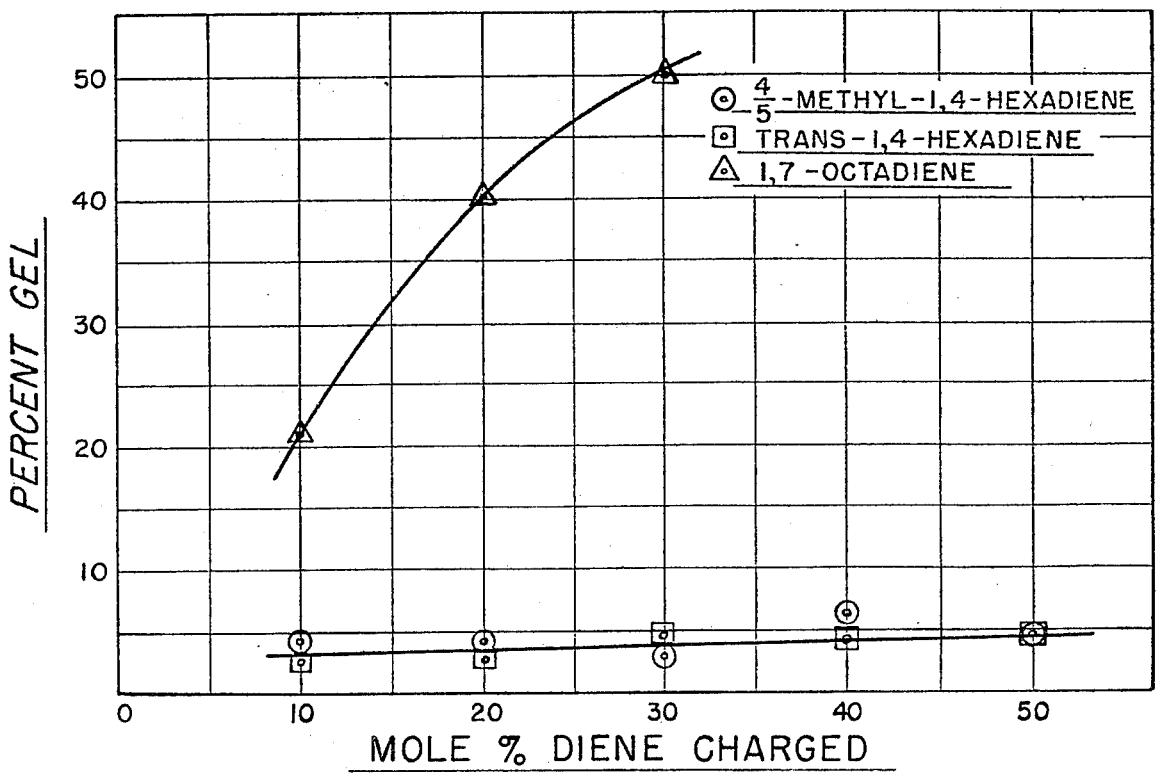
FIG. 2 PERCENT GEL VS. DIENE CHARGED

SULFUR VULCANIZABLE INTERPOLYMERS

This invention relates to both the preparation and composition of polymers and more particularly to the preparation and composition of interpolymers of olefins and nonconjugated diolefins. Many of these interpolymers are valuable as synthetic rubbers.

The prior art teaches the use of olefins and diolefins for interpolymerization in order to make useful sulfur curable interpolymers. The primary reason for using a diolefin for these interpolymers is to provide unsaturation for subsequent vulcanization. It has now been discovered that interpolymers of 5-methyl-1,4-hexadine with certain monoolefins are novel in nature since they are not taught by the prior art. These interpolymers, formed in high conversion, not only possess high molecular weight, but also negligible gel. These interpolymers may be rubbery, leathery, or resinous in nature. However, rubbery polymers are preferred.

It is not essential to use 5-methyl-1,4-hexadiene as a diolefin of 100 percent purity. However, it is important that this diolefin be free from other compounds which would interfere in the formation of high molecular weight, unsaturated interpolymers in high conversion.

One of the methods known to the art for synthesizing 5-methyl-1,4-hexadiene is by the condimerization of isoprene and ethylene. However, this method yields 4-methyl-1,4-hexadiene in addition to the 5-methyl-1,4-hexadiene. It was also unexpectedly discovered that 4-methyl-1,4-hexadiene cannot be used in place of 5-methyl-1,4-hexadiene to prepare high molecular weight interpolymers possessing the desired curability and vulcanizate properties.

It was also discovered that as long as 5-methyl-1,4-hexadiene is at least 15 mole percent of the isomeric mixture, excellent physical and mechanical properties of vulcanizates of these interpolymers are maintained when they are prepared by employing judicious amounts of methyl-1,4-hexadienes. The present invention is directed to sulfur vulcanizable unsaturated interpolymers of at least one terminally unsaturated monoolefin, wherein the monoolefin is selected from the group consisting of 1-butene and/or a monoolefin having from 5 carbon atoms to about 12 carbon atoms with a nonconjugated diolefin which is a mixture of 4- and 5-methyl-1,4-hexadienes, wherein said 5-methyl-1,4-hexadiene isomer is at least 15 mole percent of said 4- and 5-methyl-1,4-hexadiene mixture and said monoolefin comprises from about 98 to about 50 mole percent of the total monomers charged. Thus, the interpolymers of the present invention are prepared from about 2 to about 50 mole percent of charged diolefin and from about 98 to about 50 mole percent monoolefin.

Another embodiment of the present invention is sulfur valcanizable unsaturated interpolymers of at least one terminally unsaturated monoolefin selected from the group consisting of 1-butene, 1-pentene, 1-hexene, 1-heptene, 1-octene, 1-nonene, 1-decane, 1-undecene and 1-dodecene, with a nonconjugated diolefin which is a mixture of 4- and 5-methyl-1,4-hexadiene isomers wherein said 5-methyl-1,4-hexadiene isomer is at least 15 mole percent of said 4- and 5-methyl-1,4-hexadiene mixture and said terminally unsaturated monoolefin comprises from about 98 to about 50 mole percent of the total monomer charged.

Another embodiment of the present invention is the preparation of sulfur vulcanizable unsaturated interpolymers comprising reacting at least one terminally unsaturated monoolefin, wherein the monoolefin is selected from the group consisting of 1-butene and/or a monoolefin having from 5 carbon atoms to about 12 carbon atoms with a nonconjugated diolefin which is a mixture of 4- and 5-methyl-1,4-hexadiene isomers under polymerization conditions in the presence of a coordination catalyst prepared from an organometallic reducing agent and a transition metal salt, or mixtures thereof, wherein said 5-methyl-1,4-hexadiene isomer is at least 15 mole percent of said 4- and 5-methyl-1,4-hexadiene mixture and said terminally unsaturated monoolefin comprises from about 98 to about 50 mole percent of the total monomer charged.

The polymerization reactions of the present invention may be accomplished by the use of catalysts generally known as coordination catalysts. Representative of such catalyst systems is a mixture of an organometallic reducing agent with a transition metal salt, or mixtures thereof. Compounds of the transition heavy metals are those derived from metals of the B sub-groups of IV to VII or Group VIII of the Periodic Table. Th organometallic reducing agents are selected from organometallic compounds, hydrides and free metals of Groups I to IV of the Periodic Table. The compounds of the transition metals are preferably halides, oxyhalides and alkoxides, the preferred metals being titanium and vanadium. The metals of the organometallic reducing agents are preferably lithium, magnesium, aluminum and tin and the organic portions are preferably hydrocarbon radicals containing 1–10 carbon atoms or aryl groups such as phenyl, tolyl or naphthyl. Preferably the organometallic compound is an aluminum compound, more preferably an alkyl aluminum halide. In these organometallic compounds, the valences of the metal may be partially satisfied by halogen or alkoxy, provided, of course, that at least one bond connects the metal with an organic radical. Mixtures of two or more compounds of the type described above may often be used to advantage. These catalysts are not the subject of the present application. Coordination catalysts have been reviewed in "Stereochemistry of Macromolecules," edited by A. D. Ketley and published by Marcel Dekker, Inc., New York (1967). The addition of a third component, consisting of an electron donor molecular, may be employed to the benefit of the above coordination catalysts. Examples of donor molecules include various amines, phosphines, ethers, sulfides, pyridines, and related compounds classified as electron donor molecules. Ordinarily, the transition metal salt is employed in an amount such as to provide about 0.0002 to 0.01, preferably about 0.0003 to 0.0004 mole of transition metal compound per mole of monomers being polymerized.

The organometallic compound is usually employed in an amount so as to provide an organometallic compound/transition metal compound molar ratio of about 0.5 to 15, preferably about 0.75 to five, most preferably about two.

The amount of catalyst by weight is from about 0.1 to about 10 phm (parts per hundred parts of monomer), the preferred range being about 0.5 to five phm.

The polymerizations can be conducted in an inert solvent. However, they may be conducted in bulk polymerization. By "inert solvent" is meant one that will not adversely affect the reaction rate or reaction product. Convenient solvents are aliphatic, aromatic or cycloaliphatic hydrocarbons. Representatives of such solvents are heptane, hexane, benzene, toluene, cyclopentane, cyclohexane and the like. Chlorinated hydrocarbons such as trichloroethylene, tetrachloroethylene and chlorobenzene may be used.

The polymerization reactions involved in this invention can be carried out over a wide range of temperatures. It is convenient to carry out the process at temperatures of −20° C. to 100° C., preferably 0° C. to 50° C. The reactions may be carried out at atmospheric pressure or subatmospheric pressure or superatmospheric pressure.

EXPERIMENTAL

Unless otherwise specified, the following solutions and suspensions were used for carrying out the polymerization reaction.

Triethylaluminum-titanium tetrachloride-vanadium tetrachloride ($Et_3Al$—$TiCl_4$—$VCl_4$) three-component catalyst was preformed at about 90° C. according to the general procedure of British Pat. No. 886,371 and the resulting suspension used as a polymerization catalyst in heptane. The titanium and vanadium halides together constituted about 0.4 molarity with the atomic ratio of titanium/vanadium (Ti/V) being one and the atomic ratio of aluminum/(titanium + vanadium) [Al/(Ti+V)] being about 0.4. For polymerization purposes, the preformed catalyst was modified with additional triethylaluminum (TEAL) so that the final ratio of Al/Ti was 2.5. Triethylaluminum-titanium tetrachloride catalyst was also preformed and used for polymerization according to the general procedure for the three-component catalyst.

Another type of catalyst system used for preparing unsaturated interpolymers consisted of α-titanium trichloride-triethylaluminum (α—$TiCl_3$—$Et_3Al$) or α-titanium trichloride-diethylaluminum chloride (α—$TiCl_3$—$Et_2AlCl$). The α—$TiCl_3$ used contained 0.33 moles of aluminum trichloride per mole of α—$TiCl_3$.

Unless stated otherwise, all polymerization reactions were conducted in a nitrogen atmosphere. The polymerization mixture was precipitated in excess methanol containing 0.2 percent phenyl beta-naphthylamine (PBNA) stabilizer, followed by drying under reduced pressure.

As employed in this specification, inherent viscosity is defined as the natural logarithm of the relative viscosity at 30° C. divided by the polymer concentration for a 0.05 to 0.10 percent (w./v.) solution in toluene containing 0.1 percent stabilizer and expressed in units of deciliters per gram (dl./g.).

Percent insolubility of vulcanizates in toluene was determined at 25° C. after immersion in toluene for 72 hours by placing one gram of sample in 200 milliliters (ml.) of toluene. The toluene solvent was changed after 24, 48 and 72 hours. The swollen sample was weighed and subsequently dried under vacuum to determine the weight of insoluble gel. From the same measurement, swelling ratio, Q, of the gel fraction was calculated as the ratio of the weight of toluene in the swollen sample to the weight of the toluene-insoluble gel. The percent insolubility and swelling ratio were corrected for the amount of filler present in a vulcanizate.

FIGS. 1 and 2 further illustrate the novelty of the instant invention.

FIG. 1 illustrates how the 4/5-methyl-1,4-hexadiene gives a higher inherent viscosity indicating a higher molecular weight polymer than those produced by trans-1,4-hexadiene or 1,7-octadiene.

FIG. 2 illustrates how the percent gel remains at a low level using the 1,4-hexadienes even though the charged amount is increased. The 1,7-octadiene makes more undesirable gel as more is charged.

The practice of this invention is illustrated by reference to the following examples which are intended to be representative rather than restrictive of its scope.

EXAMPLE I

Solutions containing 80 ml. of 1-hexene, indicated amount of diene, and 80 ml. of pentane were sparged with nitrogen in 8-ounce bottles. Next, the required amount of a 1.5 M. solution of $Et_3Al$ in heptane was added, followed by the required amount of a preformed $Et_3Al/VCl_4/TiCl_4$ catalyst suspension in heptane [0.37 M.(Ti+V halides); Ti/V atomic ratio = 1; Al/(Ti+V) atomic ratio = 0.4]. The atomic ratio of aluminum to transition metals in the final catalyst was 2.5. The solutions were polymerized at room temperature (about 25° C.) while being mechanically shaken. The resulting polymers were precipitated in excess methanol containing phenyl beta-naphthylamine as a stabilizer and dried under vacuum. The polymers, 100 parts (by weight) were separately mixed on a two-roll mill with five parts zinc oxide, one part tetramethylthiuram disulfide, 0.5 part 2-mercaptobenzothiazole, and two parts sulfur. These compounded samples were then press cured and swelling ratio, Q, and percent solubility determined from their gum vulcanizates. Inherent viscosities of the polymers and curability data on their gum vulcanizates are shown in Table 1. The curability data indicate that the vulcanizates of the interpolymers prepared with the 4/5-methyl-1,4-hexadienes or 1,7-octadiene exhibit high crosslink density based on their low swelling ratio and low percent solubility data. The vulcanizates of interpolymers prepared with trans- or cis-1,4-hexadiene showed a significantly higher percent solubility. The polymers prepared with the other dienes were either not sulfur vulcanizable or produced vulcanizates of low crosslink density and high solubility even though the amount of diene charged was 2.5-15 times that of 4/5-methyl-1,4-hexadiene. The inherent viscosity data indicate that the highest molecular weight interpolymers, which also exhibit good curability were obtained with the 4/5-methyl-1,4-hexadiene mixture.

Table 1

| Diene | Mole % Chgd. | Catalyst phm[a] | Polymer, % Conversion | Inherent Viscosity dl/g | Curing Min/° F | Q | % Solubility |
|---|---|---|---|---|---|---|---|
| 4/5-Methyl-1,4-hexadiene[b] | 2 | 0.33 | 90 | 4.1 | 30/320 | 4.8 | 2.7 |
| 4/5-Methyl-1,4-hexadiene[b] | 5 | 0.33 | 66 | 4.5 | 30/320 | 3.5 | 1.3 |
| Trans-1,4-hexadiene | 2 | 0.33 | 91 | 2.1 | 30/320 | 5.5 | 8.4 |
| Trans-1,4-hexadiene | 5 | 0.56 | 77 | 2.1 | 30/320 | 3.5 | 5.7 |
| Cis-1,4-hexadiene | 2 | 0.33 | 65 | 2.2 | 30/320 | 5.6 | 8.7 |
| Cis-1,4-hexadiene | 5 | 0.56 | 56 | 1.4 | 30/320 | 4.0 | 7.9 |
| 1,7-octadiene | 5 | 0.33 | 93 | 3.1 | 30/320 | 4.1 | 2.1 |

Table 1-continued

Inherent Viscosity and Curability Data on Interpolymers

| Diene | Mole % Chgd. | Catalyst phm[a] | Polymer, % Conversion | Inherent Viscosity dl/g | Curing Min/° F | Q | % Solubility |
|---|---|---|---|---|---|---|---|
| Isoprene | 30 | 1.00 | 79 | — | 30/310 | 7.9 | 65 |
| 1,5-Hexadiene | 10 | 0.47 | 98 | 2.0 | 30/310 | 21.8 | 32 |
| 3-Methyl-1,3-pentadiene | 20 | 0.36 | 28 | 5.1 | 30/310 | — | No cure |
| 5-Ethylidene-2-Norbornene | 10 | 0.80 | 52 | 4.7 | 30/310 | 41.6 | 46 |
| Dicyclopentadiene | 10 | 0.80 | 62 | 5.4 | 30/310 | — | No cure |
| 1,5-Cyclooctadiene | 5 | 0.36 | 84 | 3.2 | 30/310 | — | No cure |
| 5-Vinyl Norbornene | 10 | 0.80 | 40 | 4.2 | 30/310 | — | No cure |
| 4-Vinyl Cyclohexene | 5 | 0.33 | 84 | 2.5 | 30/310 | — | No cure |
| 5-(3-Butenyl)-2-Norbornene | 10 | 1.60 | 63 | 3.8 | 30/310 | 27.2 | 14 |

[a]Phm refers to weight parts per 100 parts of monomer mixture.
[b]Mixture of 4-methyl-1,4 hexadiene and 5-methyl-1,4-hexadiene, molar ratio 1.5/1.

EXAMPLE II

Solutions containing equal volumes of 1-hexene and pentane and 10 to 50 mole percent charge of 1,7-octadiene, trans-1,4-hexadiene or 4/5-methyl-1,4-hexadiene mixture (molar ratio 4-methyl/5-methyl isomers = 1.5/1) were polymerized with an $Et_3Al/VCl_4TiCl_4$ catalyst as in Example I. In FIG. I, the inherent viscosities of the interpolymers are plotted as a function of the mole percent diene charged. The inherent viscosities of the interpolymers prepared with the 4/5-methyl-1,4-hexadiene mixture were considerably higher than those of the other interpolymers at the equivalent level of diene charged. In FIG. 2 the percent gel of the interpolymers of 1,7-octadiene were sharply increased from about 20 percent to 50 percent as the diene charged was increased from 10 to 30 mole percent, whereas gel contents of less than five percent were obtained for the interpolymers prepared with the trans-1,4-hexadiene or 4/5-methyl-1,4-hexadiene mixture.

EXAMPLE III

Several interpolymers of 1-hexene and the specified dienes were synthesized with the $Et_3Al/VCl_4/TiCl_4$ catalysts according to the procedure of Example I. The $Et_2AlCl/\alpha-TiCl_3$ catalyst was prepared in situ by the addition of a 1.5 M. solution of $Et_2AlCl$ in heptane followed by 1.0 M. $\alpha-TiCl_3$ (contains 0.33 M. $AlCl_3$) suspension in heptane (molar ratio $Et_2AlCl/TiCl_3$ = 1.5). The resulting interpolymers were isolated as described in Example I. The copolymers were mixed with 50 phr. ISAF carbon black, 5 phr zinc oxide and 2 phr stearic acid in a Brabender. The black stocks, 157 parts, were compounded on a 2-roll mill with one phr tetramethylthiuram disulfide, 0.5 phr 2-mercaptobenzothiazole, and two phr sulfur. The compounded stocks were then press cured into tensile sheets using the designated curing conditions. The stress-strain properties of these vulcanizates are shown in Table 2.

The interpolymers prepared from three and 10 mole percent of 1,7-octadiene with Catalyst B exhibit lower inherent viscosity, higher gel, and considerably lower tensile strength than the corresponding polymers prepared with the 4/5-methyl-1,4-hexadiene mixture (molar ratio of 4-methyl to 5-methyl isomers was 1.5/1). The interpolymers prepared with a five mole percent charge of trans-1,4-hexadiene show sharply lower inherent viscosity and tensile strength as compared to the corresponding data from the interpolymers prepared from a three or 10 mole percent charge of the 4/5-methyl-1,4-hexadiene mixture (molar ratio of isomers = 1.5/1). The data also indicate that for a 10 mole percent charge of 4/5-methyl-1,4-hexadiene mixture the vulcanizate tensile strength falls below 2000 psi when the mole percent of 4-methyl-1,4-hexadiene in the diene mixture becomes greater than 85 percent. By "phr" as used herein is meant parts per hundred of rubber.

Table 2

Stress-Strain Properties of Hexene/Diene Interpolymer Vulcanizates

| Catalyst[a] | Diene | Mole % Charged | Polymer Inherent Viscosity | % Gel | Curing Min/° F. | Tensile Strength, psi | Elongation at Break,% | 300% Modulus, psi |
|---|---|---|---|---|---|---|---|---|
| A | 4/5-Methyl-1,4-hexadiene[b] | 3 | 7.0 | 0 | 35/310 | 2590 | 520 | 1130 |
| B | 4/5-Methyl-1,4-hexadiene[b] | 3 | 5.3 | 1.6 | 35/310 | 2350 | 540 | 1100 |
| A | 4/5-Methyl-1,4-hexadiene[b] | 10 | 7.0 | 3.0 | 15/310 | 2420 | 395 | 1760 |
| B | 4/5-Methyl-1,4-hexadiene[b] | 10 | 4.3 | 0 | 15/310 | 2100 | 370 | 1690 |
| B | 4/5-Methyl-1,4-hexadiene[c] | 10 | 4.4 | 2.7 | 40/300 | 2130 | 420 | 1520 |
| B | 4/5-Methyl-1,4-hexadiene[d] | 10 | 4.3 | 4.9 | 40/300 | 1830 | 410 | 1270 |
| B | 1,7-Octadiene | 3 | 4.4 | 3.6 | 35/310 | 1850 | 515 | 970 |
| B | 1,7-Octadiene | 10 | 3.3 | 21.0 | 15/290 | 1510 | 415 | 1070 |
| A | Trans-1,4-hexadiene | 5 | 2.3 | 4.0 | 15/310 | 1620 | 490 | 800 |
| B | Trans-1,4-hexadiene | 5 | 2.2 | 0 | 15/310 | 1590 | 440 | 1200 |

[a]Catalyst A: $Et_2AlCl/\alpha-TiCl_3$, Al/Ti = 1.5. Catalyst B: $Et_3Al/VCl_4/TiCl_4$, Ti/V = 3, Al/(Ti + V) = 2.5.
[b]Molar ratio of 4-methyl to 5-methyl isomers was 1.5:1.
[c]Molar ratio of 4-methyl to 5-methyl isomers was 5.66:1.
[d]Molar ratio of 4-methyl to 5-methyl isomers was 9:1.

EXAMPLE IV

Solutions containing equal volumes of 1-hexene and pentane and a three mole percent charge (based on total monomers) of 4-methyl-1,4hexadiene (96% purity), 5-methyl-1,4-hexadiene (99% purity), or a 4/5-methyl-1,4-hexadiene mixture were polymerized with an $Et_2AlCl/\alpha TiCl_3$ catalyst and an $Et_3Al/TiCl_4$ catalyst. The polymers were isolated according to the procedure of Example I and compounded with carbon black and curing ingredients of the recipe described in Example II. The vulcanizates of the interpolymers prepared with either the 5-methyl-1,4-hexadiene or the 4/5-methyl-1,4-hexadiene mixture exhibit markedly higher tensile strength and higher crosslink density (as measured by 300% modulus and swelling ratio, Q) than vulcanizates of the interpolymers prepared from the 4-methyl-1,4-hexadiene (Table 3).

Table 3

Stress-Strain and Sol-Gel Properties of Vulcanizates of Hexene/Diene Interpolymers

| Cata-[a] lyst | Methyl-1,4 hexadiene isomer | Polymer Inherent Viscosity dl/g | Polymer Conversion % | Curing, Min/ 310° F | Tensile Strength, psi | Elongation at Break, % | 300% Modulus, psi | Q | % Solubility |
|---|---|---|---|---|---|---|---|---|---|
| A | 4-methyl | 7.4 | 75 | 35 | 545 | 1180 | 68 | 12.0 | 18 |
| B | 4-methyl | 4.5 | 75 | 35 | 700 | 1060 | 125 | 6.5 | 13 |
| A | 5-methyl | 6.7 | 76 | 15 | 2520 | 575 | 990 | 3.1 | 3.0 |
| B | 5-methyl | 4.0 | 74 | 20 | 2060 | 505 | 1030 | 2.4 | 2.9 |
| A | 4/5-methyl[b] | 8.4 | 53 | 35 | 2670 | 475 | 1070 | 3.5 | 2.7 |
| B | 4/5-methyl[b] | 4.5 | 56 | 35 | 2230 | 630 | 715 | 3.2 | 3.8 |

[a]Catalyst A: $Et_2AlCl/\alpha\text{-}TiCl_3$, Al/Ti atomic ratio = 1.5 Catalyst B: $Et_3Al/TiCl_4$, Al/Ti = 2.5
[b]Molar ratio of 4-methyl to 5-methyl isomers was 1.5:1.

EXAMPLE V

Heptane solutions containing 25 weight percent of 1-butene, 1-hexene, and indicated diene were polymerized with a $Et_2AlCl/\alpha\text{-}TiCl_3$ catalyst (molar ratio $Et_2AlCl/\alpha\text{-}TiCl_3 = 1.5$). The polymers were isolated according to the procedure of Example I and compounded with carbon black and curing ingredients of the recipe described in Example II. The vulcanizate properties in Table 4 show the distinct superiority of the 5-methyl-1,4-hexadiene isomer and the mixture over that of the 4-methyl-1,4-hexadiene alone.

Table 4

Stress-Strain and Sol-Gel Properties of Vulcanizates of Butene/Hexene/Diene Interpolymers (60/37/3 mole percent charge ratio)

| Methyl-1,4 hexadiene isomer | Polymer % Conversion | Polymer I.V.[a] dl/g | Curing Time at 310° F. Min. | Tensile Str. psi | Elongation at Break % | 300 % Modulus, psi | Q | % Solubility |
|---|---|---|---|---|---|---|---|---|
| 4-Methyl | 86 | 3.8 | 35 | 505 | 630 | 120 | 15.4 | 40 |
| 5-Methyl | 82 | 3.8 | 15 | 2630 | 460 | 1300 | 3.1 | 3.8 |
| 4/5-Methyl[b] | 70 | 3.8 | 35 | 2670 | 560 | 860 | 3.4 | 3.0 |

[b]Molar ratio of 4-methyl to 5-methyl isomers was 1.5:1.
[a]I.V = inherent viscosity.

EXAMPLE VI

A solution of an equal volume of 1-pentene and pentane and a 3 mole percent charge (based on total monomers) of a 4/5-methyl-1,4-hexadiene mixture (1.5/1 molar ratio) was polymerized at 25° C. with a $Et_3Al/VCl_4/TiCl_4$ catalyst as in Example I. The conversion to interpolymer (inherent viscosity = 5.7) was 75 percent in 72 hours. The interpolymer gave a glass transition temperature of −33° C. and melting endotherms at 55° and 82° C. as measured by Differential Thermal Analysis (DTA) using a calorimetric attachment. The interpolymer was compounded with carbon black and curing ingredients as described in Example II. The vulcanizate obtained by curing for 20 minutes at 310° F. had a tensile strength of 2540 psi at 440 percent elongation at break and a 300 percent modulus of 1746 psi.

EXAMPLE VII

A heptane solution containing 25 weight percent of an 80/15/5 mole percent charge ratio of 1-butene, 1-octene, and a 4/5-methyl-1,4-hexadiene mixture (1.5/1 molar ratio) was polymerized at 25° C. with an $Et_2AlCl/\alpha\text{—}TiCl_3$ catalyst (molar ratio $Et_2AlCl/\alpha\text{-}TiCl_3 = 1.5$). The conversion to interpolymer (inherent viscosity = 4.1) was 67 percent in 48 hours. The interpolymer gave a glass transition temperature of −44° C. and melting endotherms at 50° and 90° C. as measured by DTA using a calorimetric attachment. The interpolymer was compounded with carbon black and curing ingredients as described in Example II. The vulcanizate obtained by curing for 20 minutes at 310° F. had a tensile strength of 3270 psi at 470 percent elongation at break and a 300 percent modulus of 1650 psi.

EXAMPLE VIII

A heptane solution containing 25 weight percent of an 85/15/5 mole percent charge ratio of 1-butene, 1-decene, and a 4/5-methyl-1,4-hexadiene mixture (1.5/1 molar ratio) was polymerized at 25° C. with a $Et_2AlCl/\alpha\text{-}TiCl_3$ catalyst (molar ratio $Et_2AlCl/\alpha\text{—}TiCl_3 = 1.5$). The conversion to interpolymer (inherent viscosity = 3.5) was 63 percent in 48 hours. The interpolymer gave a glass transition temperature of −45° C. and melting endotherms at 48° and 85° C. as measured by DTA using a calorimetric attachment. The interpolymer was compounded with carbon black and curing ingredients as described in Example II. The vulcanizate obtained by curing for 20 minutes at 310° F. had a tensile strength of 3200 psi at 450 percent elongation at break and a 300 percent modulus of 1815 psi.

EXAMPLE IX

A solution of an equal volume of 1-hexene and pentane and a three mole percent charge (based on total monomers) of a 4/5-methyl-1,4-hexadiene mixture (1.5/1 ratio) was polymerized at 25° C. with an $Et_2AlC$-

1/α—TiCl₃ catalyst (0.15 phm) according to the procedure used in Example III. The resulting interpolymer (40 percent conversion in 72 hours) was isolated as described in Example I. The interpolymer exhibited an intrinsic viscosity of 6.5 in benzene at 25° C. and a number average molecular weight value of 902,000 (Membrane Osmometer, toluene, 37° C.).

Thus, this invention is directed to sulfur vulcanizable unsaturated interpolymers prepared from at least one terminally unsaturated monoolefin selected from the group consisting of 1-butene and α-olefins containing from 5 to 12 carbon atoms with at least one nonconjugated diolefin selected from the group of 4- and 5-methyl-1,4-hexadiene in which 5-methyl-1,4-hexadiene is at least 15 mole percent and in which the terminally unsaturated monoolefin comprises from about 98 to about 50 mole percent of the total monomer charged.

Another embodiment of the present invention is a process for preparing sulfur vulcanizable unsaturated interpolymers comprising reacting at least one terminally unsaturated monoolefin selected from the group consisting of 1-butene and α-olefins containing from 5 to 12 carbon atoms with at least one nonconjugated diolefin selected from the group of 4- and 5-methyl-1,4-hexadienes in which 5-methyl-1,4-hexadiene is at least 15 mole percent, under solution polymerization conditions in the presence of a coordination catalyst prepared from an organometallic reducing agent and a transition metal salt or mixtures thereof and in which the terminally unsaturated monoolefin comprises from about 98 to about 50 mole percent of the total monomer charged. The terminally unsaturated monoolefins need not be linear.

A particularly interesting embodiment of the present invention is the preparation of a sulfur vulcanizable unsaturated interpolymer from the terminally unsaturated monoolefin 1-hexene with the nonconjugated diolefins 4-and 5-methyl-1,4-hexadienes wherein said interpolymer has an intrinsic viscosity greater than 5.1 dl/gm in benzene at 25° C.

While certain representative embodiments and details have been shown for the purpose of illustrating the invention, it will be apparent to those skilled in this art that various changes and modifications may be made therein without departing from the spirit or scope of the invention.

What is claimed is:

1. Sulfur vulcanizable unsaturated interpolymers prepared from at least one terminally unsaturated monoolefin selected from the group consisting of 1-butene and α-olefins containing from 5 to 12 carbon atoms with a nonconjugated diolefin wherein said nonconjugated diolefin is a mixture of 4- and 5-methyl-1,4-hexadienes in which said 5-methyl-1,4-hexadiene is at least 15 mole percent of said nonconjugated diolefin mixture and in which said terminally unsaturated monoolefin comprises from about 98 to about 50 mole percent of the total monomer charged.

2. The interpolymers according to claim 1 in which the terminally unsaturated monoolefin is selected from the group consisting of 1-butene, 1-pentene, 1-hexene, 1-heptene, 1-octene, 1-nonene, 1-decene, 1-undecene and 1-dodecene.

3. The interpolymers according to claim 1 in which the terminally unsaturated monoolefin is 1-hexene.

4. The interpolymers according to claim 1 in which the nonconjugated diolefin is 5-methyl-1,4-hexadiene.

5. The interpolymers according to claim 1 in which the terminally unsaturated monoolefin is 1-hexene and the nonconjugated diolefin is 5-methyl-1,4-hexadiene.

6. The interpolymers according to claim 1 wherein the terminally unsaturated monoolefin is selected from the group consisting of 1-butene, 1-hexene, 1-octene and 1-decene and the nonconjugated diolefin is 5-methyl-1,4-hexadiene.

7. The interpolymers according to claim 1 wherein the terminally unsaturated monoolefin is 1-hexene and said interpolymer has an intrinsic viscosity greater than 5.1 in benzene at 25° C.

8. The interpolymer according to claim 1 wherein the terminally unsaturated monoolefin is 1-pentene.

* * * * *